S. D. KING.
Lawn-Mowers.

No. 149,133.  Patented March 31, 1874.

WITNESSES.  INVENTOR.

UNITED STATES PATENT OFFICE.

SIDNEY D. KING, OF MIDDLETOWN, NEW YORK.

IMPROVEMENT IN LAWN-MOWERS.

Specification forming part of Letters Patent No. 149,133, dated March 31, 1874; application filed January 24, 1874.

*To all whom it may concern:*

Figure 1:
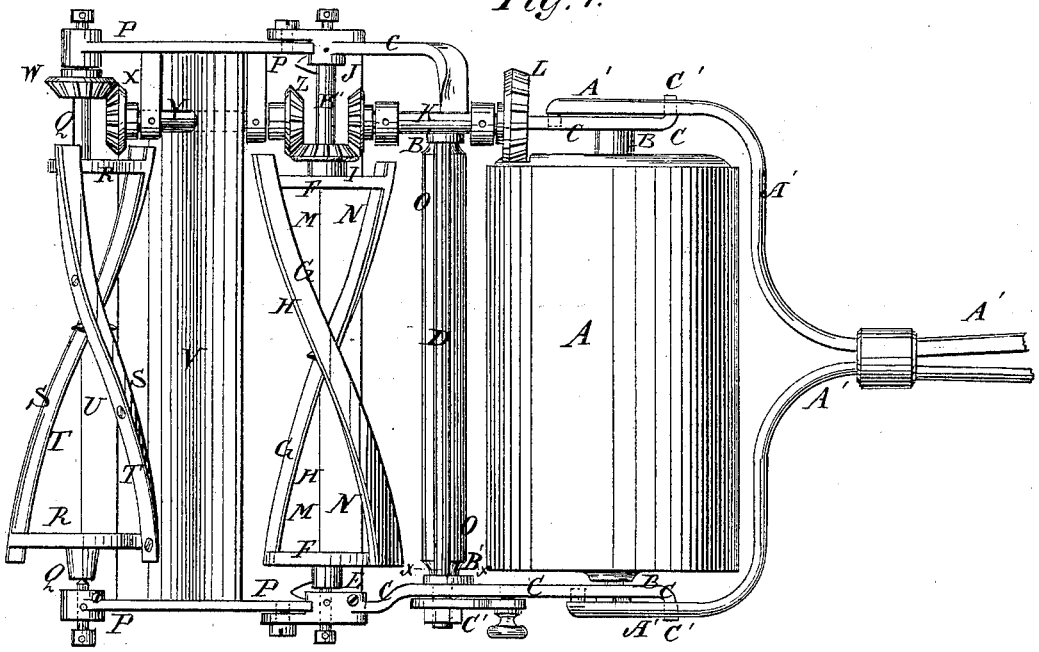
Figure 2:
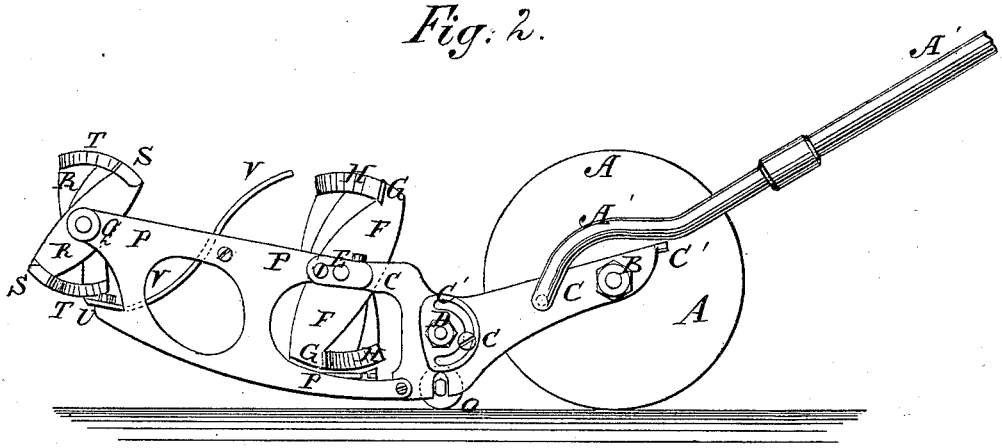
Figure 3:

Be it known that I, SIDNEY D. KING, of Middletown, in the county of Orange and State of New York, have invented a new and useful Improvement in Lawn-Mower, of which the following is a specification:

Figure 1 is a top view of my improved lawn-mower. Fig. 2 is a side view of the same. Fig. 3 is a detail section taken through the line $x\,x$, Fig. 1.

Similar letters of reference indicate corresponding parts.

The invention relates to a machine especially adapted for cutting high grass; and consists in two sets of revolving cutters arranged in a frame in such a way that one set severs the upper portion of the high grass, and the second or rear set works close to the ground. The machine is also adapted for cutting short grass, like others of its class.

A represents the roller, which revolves upon the shaft B, and is connected with said shaft by a ratchet-wheel and pawls, so that when the mower is moved forward the said roller may carry the said shaft with it; but when the machine is moved backward, the roller will not carry the shaft with it. The journals of the shaft B revolve in bearings in the bars C, which are connected in front of the roller A and held in their proper relative position by a rod, D. In bearings in the upper forward part of the bars C revolve the journals E to the inner ends of which are attached cross-bars or arms F, to the ends of which are attached the spiral bars G, to which the knives H are attached. To one of the journals E is attached a bevel-gear wheel, I, into the teeth of which mesh the teeth of the bevel-gear wheel J, attached to the forward end of the shaft K. The shaft K revolves in bearings attached to one of the bars C, and to its rear end is attached a bevel-gear wheel, L, the teeth of which mesh into the teeth of a large bevel-gear wheel attached to the shaft B, and which is not shown in the drawings, so that the set of cutters may be rotated by the revolution of the shaft B. As the cutters F G H revolve the grass is cut against the knife M attached to the bar N, the ends of which are attached to the lower part of the forward ends of the bars C. O is a roller which rolls upon the ground and prevents the cutters from coming in contact with the ground. The roller O revolves upon a shaft, the ends of which enter slots in the bars C, so that it may be raised or lowered to adjust the machine to cut the grass higher or lower, as may be desired. The ends of the said roller-shaft or the journals of the roller also pass through holes in the lower ends of the bars or supports B′, which are slotted to receive the screw or bolt by which they are secured to the inner sides of the bars C, and in their upper ends are formed holes to receive cams $d'$ formed upon the rod D. To one end of the rod D is attached a segment of a crank-wheel, C′, in which is formed a curved slot to receive the clamping-screw by which it is secured to the bar C when adjusted. This construction enables the gage-roller O to be easily and quickly adjusted, as desired. To the forward ends of the bars C are attached the bars or frames P, to the upper part of the forward ends of which are pivoted the journals Q, to the inner ends of which are attached cross-arms R, to the ends of which are attached spiral bars S, to which are attached the knives T. The knives T cut the grass against a knife, U, attached to the forward edge of the plate V, which is attached to the lower part of the forward ends of the bars P. The plate V curves upward and rearward, and is designed to prevent the grass cut by the forward set of cutters from being thrown back against the rear cutters, and thus impeding their operation. The forward set of cutters are so arranged as to cut the grass four inches high, more or less, as may be desired. To one of the journals Q is attached a gear-wheel, W, the teeth of which mesh into the teeth of the bevel-gear wheel X, attached to the forward end of the shaft Y, which shaft revolves in bearings attached to the frame or bar P, and to its rear end is attached a bevel-gear wheel, Z, the teeth of which mesh into the teeth of the gear-wheel I on the shaft B″, so that the forward set of cutters may also be driven from the shaft B. To the bars C, a little in front of the shaft B, are pivoted the ends of the forks of the handle A′, by which the machine is propelled. To the rear ends of the bars C, a little in front of the shaft B, are attached, or upon them are formed, projections $c'$, upon which the forks of the handle A' may rest, to serve as fulcrums to enable the cutters to be raised from the ground when desired.

Having thus described my invention, I claim as new, and desire to secure by Letters Patent—

1. In a lawn-mower, the combination of the supplementary cutters R S T with the ordinary cutters F G H, the former being arranged in front of, and so as to cut a stubble higher than, the latter, as shown and described, to operate as specified.

2. The combination of the cutter, carrying bars or frames P, with frame C, the former being constructed and attached to the latter as shown and described, to hold the forward cutters elevated.

3. The curved guard-plate V, interposed between the two sets of cutters and attached to the bars or frames P, substantially as herein shown and described.

4. The combination of the bars or supports B', the cams $d'$, and the slotted crank-wheel segment C' with the roller O and bars C, substantially as herein shown and described.

SIDNEY D. KING.

Witnesses:
J. S. KNAPP,
CHAS. J. BOYD.